United States Patent

[11] 3,549,147

[72] Inventors Gene S. Katter
 Box 204;
 James A. Richardson, Rte. 1, Box 54,
 Brownsville, Oreg. 97327
[21] Appl. No. 735,030
[22] Filed June 6, 1968
[45] Patented Dec. 22, 1970

[54] GUNNERY TRAINING APPARATUS
 11 Claims, 5 Drawing Figs.
[52] U.S. Cl. .................................................. 273/101.1,
 352/236; 273/105.1; 35/25
[51] Int. Cl. ...................................................... A63f 9/02
[50] Field of Search .......................................... 273/101.1,
 105.1; 35/25

[56] References Cited
 UNITED STATES PATENTS
 1,120,577 12/1914 Wiese .......................... 273/105.1
 1,207,411 12/1916 Keen ............................ 273/105.1
 2,247,751 7/1941 Eakins .......................... 273/101.1
 2,957,695 10/1960 Arizpe ......................... 273/101.1X FOREIGN PATENTS
 832,178 6/1938 France ......................... 273/101.1
 331,762 1/1921 Germany ..................... 273/105.1
 399,363 10/1933 Great Britain ............... 273/105.1

Primary Examiner—Anton O. Oechsle
Assistant Examiner—Theatrice Brown
Attorney—L. R. Geisler ABSTRACT: A plurality of light-responsive electric signal producing devices are arranged behind a translucent motion picture screen at different coordinate positions for selective activation by a light-emitting gun. The picture film has two magnetic tracks coded to identify the coordinate position of a target on each picture frame, a third magnetic track coded to provide an electric timing signal for stepping the coordinate counter system and to reset the counter system after each picture frame, and a fourth magnetic track coded to represent a time condition during which firing at the target imposes a penalty on the shooter. The electrical outputs of the light-responsive devices and the magnetic track pickup devices are connected to electric signal compare devices the electrical outputs of which are connected to target hit and penalty indicator devices.

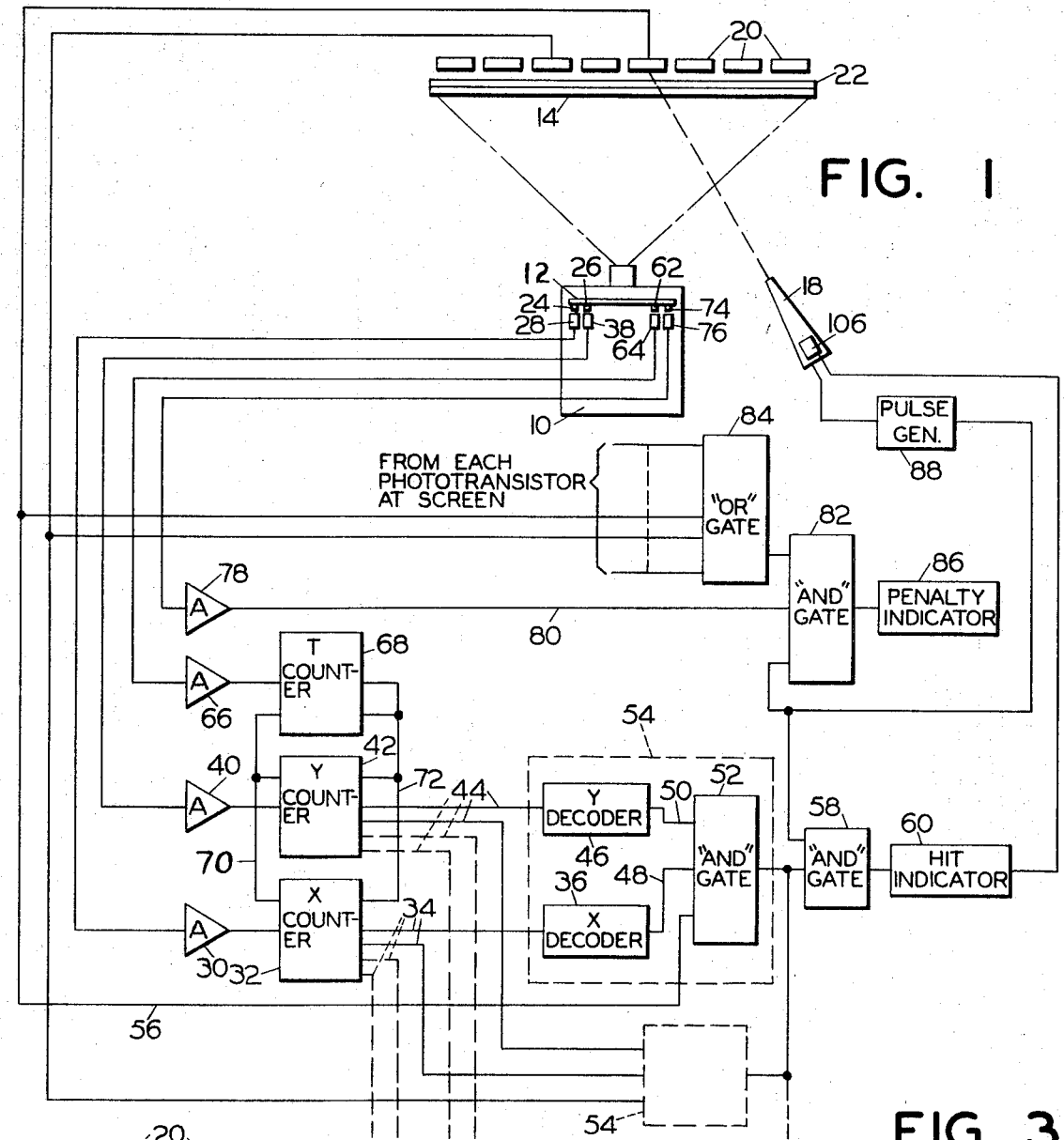
FIG. 1
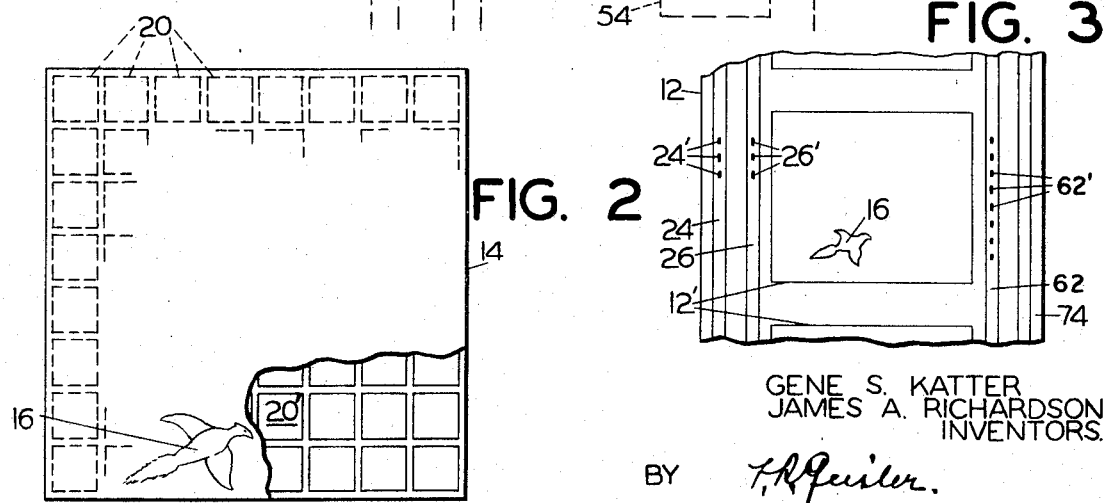
FIG. 2
FIG. 3
GENE S. KATTER
JAMES A. RICHARDSON
INVENTORS.
BY  T. R. Geisler
ATTY.

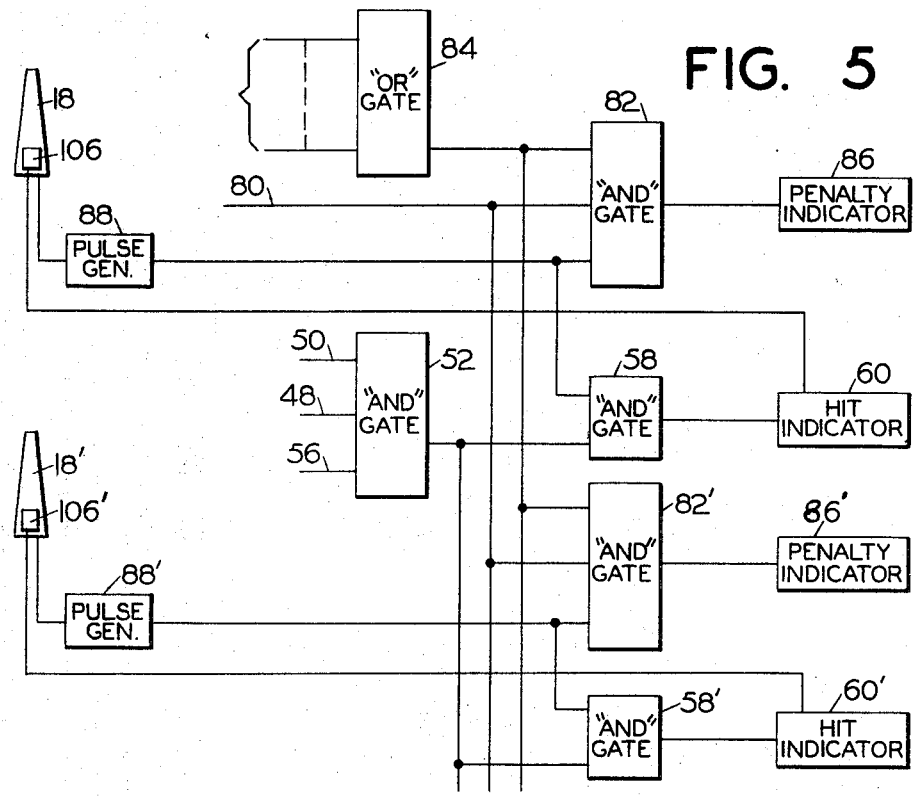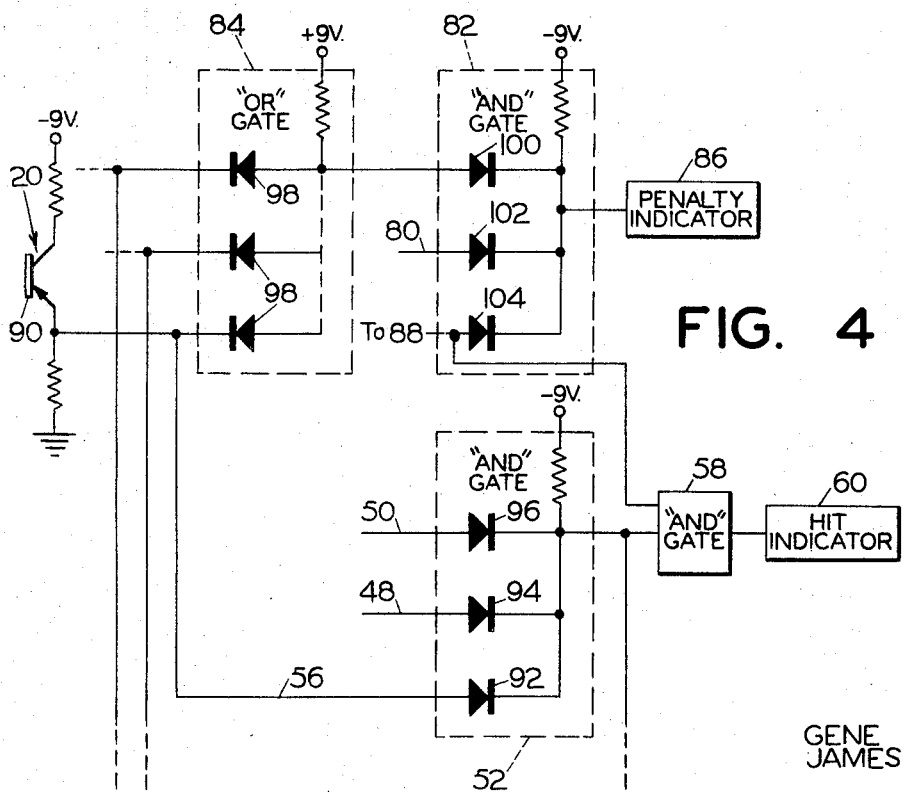

GUNNERY TRAINING APPARATUS

BACKGROUND OF THE INVENTION

This invention relates to gunnery training devices, and more particularly to a device of the class described for use in training personnel in the shooting of moving targets.

Devices of the class described have been provided heretofore. Their deficiencies reside primarily in lack of realism, inaccuracy of recording hits and misses, inability to indicate improperly timed shots, and general lack of versatility in accommodating various types of targets and shooting conditions.

SUMMARY OF THE INVENTION

In its basic concept the present invention provides a gunnery training apparatus wherein an electric signal produced by the firing of a light-emitting gun toward a light-responsive device behind a translucent motion picture screen is compared with electric signals produced from prerecorded coded "bits" on magnetic tracks on a motion picture film, to indicate target hits and firing penalties.

The foregoing and other objects and advantages of the present invention will appear from the following detailed description, taken in connection with the accompanying drawings of the preferred embodiment.

BRIEF DESCRIPTION OF THE DRAWINGS

FIG. 1 is a schematic diagram illustrating a gunnery training apparatus embodying the features of this invention.

FIG. 2 is a front elevation, partially broken away, showing a cooperative arrangement of a motion picture screen and a plurality of light-responsive electric signal devices for use in the apparatus of the present invention.

FIG. 3 is a fragmentary front elevation of motion picture film incorporating magnetic tracks for use in the apparatus of the present invention.

FIG. 4 is a schematic diagram of an electric circuit for use in the apparatus of this invention.

FIG. 5 is a schematic diagram of an electric circuit by which a plurality of guns may be operated simultaneously in association with the same motion picture.

DESCRIPTION OF THE PREFERRED EMBODIMENT

In accordance with the present invention a motion picture projector 10 is provided to project a motion picture from film 12 upon a screen 14 to display a moving image 16, such as the pheasant in flight illustrated in FIGS. 2 and 3. The screen is made of translucent material to permit the passage therethrough of a beam of light from a gun 18 equipped with a high intensity strobe light.

Behind the screen there is arranged in a two dimensional coordinate system a plurality of light-responsive electrical signal producing devices 20. These may be photo conductive or photovoltaic cells, photoresistors, phototransistors, or any other suitable devices which function upon being subjected to a beam of light rays from the gun to produce an electric signal.

Although the light source may be of any conventional type, a source of infrared light is preferred since it is invisible to the human eye. For such use it is advantageous to employ a type of photoconductive cell or phototransistor that is adjustable with respect to ambient light. Further, it may be desirable to interpose between the screen and photoconductive device an infrared filter to remove these rays from the ambient light and thus insure activation solely by the infrared strobe light gun. Such a filter may be provided in the form of a large sheet 22, as illustrated, or as individual elements associated with each light-responsive device.

The strobe light gun also preferably is of the type which is provided with a lens system for adjusting the size of the light spot at the screen. In this manner the training apparatus may be utilized to simulate rifle or pistol shooting by adjusting the light beam to a small, concentrated spot, or to simulate shotgun shooting by adjusting the beam to a size equivalent to the desired shot pattern. The motion picture film 12 employed for purposes of the present invention may be of any conventional type, including those used for home movies and those of the Cinerama type. The latter, together with stereophonic sound, is preferred for the vivid realism it provides. In any event, there is associated with the film a plurality of magnetic tracks which function by appropriate coding to control the operation of the apparatus. Although these magnetic tracks may be provided on a separate film strip synchronized with the movement of the motion picture film, in the manner of a conventional motion picture sound track, they are illustrated for simplicity in the drawing as being integral with the motion picture film.

Thus in the embodiment illustrated there is provided on the film, to the left of the picture frames 12', a pair of magnetic tracks 24 and 26 which are adapted to be coded in binary "bits" to identify the X, Y coordinate position of the target on a corresponding picture frame. For example, the position of the pheasant 16 in the picture frame illustrated in FIG. 3 is such that a successful hit will be achieved if the strobe light gun is fired to activate the light-responsive device 20' located behind the screen at the X, Y coordinate position 5, 7 (FIG. 2). Accordingly, the X ordinate magnetic track 24 is coded with "bits" 24' (FIG. 3) designating the binary digits 101, and the Y ordinate magnetic track 26 is coded to provided "bits" 26' designating the binary digits 111.

As is well known in computer technology, the "bits" designating the binary digit 1 is of one magnetic polarity and the "bits" designating the binary digit O is of the opposite polarity.

The X ordinate track 24 is associated with a magnetic readout head 28 which provides electrical output signals corresponding to the polarity of the "bits" 24' on the track. The output of the head is connected to the input of a differential amplifier 30, the output of which is connected to the input of an X ordinate binary digit counter 32. The counter is of conventional type capable of accommodating the number of X ordinates corresponding to the number of light-responsive devices 20 arranged on the X ordinate. In the embodiment illustrated, there are eight such light-responsive devices.

The plurality of outputs of the counter are connected each through a separate conductor 34 to a separate decoder 36. The decoder functions to convert the output signal from the counter to an output signal which represents a base ten number corresponding to the associated binary digits.

In similar manner, the Y ordinate track 26 on the film is associated with a readout head 38, the output of which is connected through the differential amplifier 40 to the input of a Y ordinate binary digit counter 42. Since, in the embodiment illustrated in FIG. 2, there are eight light-responsive devices 20 arranged in the Y ordinate, the counter is provided with at least eight separate outputs each connected through a conductor 44 to the input of a separate decoder 46. The output electric signal of the decoder represents the base ten numeral corresponding to the associated binary digits.

The decoders are associated in pairs to identify the X,Y coordinate position of each of the light-responsive devices 20. The output electric signals of each pair of decoders 36 and 46 are connected through electrical conductors 48 and 50, respectively, to inputs of associated "and" gate component 52. Each pair of decoders and associated "and" gate component forms an individual output unit 54, and these output units are associated one with each light-responsive device 20. In this regard the output of each light-responsive device is connected through an electrical conductor 56 to an input of the associated "and" gate component 52 which functions as an electric coordinate signal comparing device for comparing signals from the decoders and associated light-responsive device.

The outputs of all the "and" gate components 52 are connected through another "and" gate component 58, described hereinafter, to an electrically actuated indicator 60 which functions to evidence a target "hit". The indicator may be an electric lamp, a bell, a buzzer, a recording meter, a recording counter or other suitable device.

To the right of the picture frames on the film 12 another pair of magnetic tracks are provided. One of these tracks 62 is provided with coded "bits" 62' which represent the binary digit 1 and which function to provide electric timing pulses for purposes presently to be explained. This timing track has associated with it a readout head 64, the output of which is connected to the input of a differential amplifier 66. The output of the amplifier is connected to the input of a timing pulse binary digit counter 68. One output from the counter is connected through conductors 70 to the counters 32 and 42, and functions to step the latter through their counts. Another output from the timing counter is connected through conductors 72 to all three counters to effect resetting thereof upon the termination of each full count of binary digits on the track 62 associated with each picture frame.

The other track 74 of the right hand pair is coded with magnetic "bits" to provide electric pulses to indicate, for example, that a target is out of range, or that a critical time for firing has elapsed. This latter example is useful, for example, in law enforcement training, wherein a rookie would be required to score a hit within a specified time, failing which a penalty signal would register him as being the victim of his target.

The magnetic "bits" required for this purpose are of the type which represent the binary digit 1. However, no such bits are shown in FIG. 3 since the target pheasant is considered to be "in range" on the picture frame illustrated.

The output of the readout head 76 associated with the magnetic penalty track 74 is connected through the differential amplifier 78 and conductor 80 to an input of an "and" gate component 82. Also connected to an input of the component 82 is the output of an "or" gate component 84. Each of a plurality of inputs of the "or" gate component is connected to a different one of the light responsive devices 20 located behind the motion picture screen 14. The output of the "and" gate component 82 is connected to a "penalty" indicator 86 which may be similar to hit indicator 60.

Also connected to inputs of the "and" gate components 58 and 82 is the output of an electric matching signal generator 88, such as a one-shot multivibrator. The input of the generator 88 is connected to the strobe light gun 18. Upon firing the gun the generator is activated to provide an output signal to the "and" components. This arrangement utilizes the "and" gate component 58 as an electric signal compare device which matches the gun 18 to the indicators 60 and 86, and is particularly useful when a plurality of guns and associated indicators are provided, as explained hereinafter.

FIG. 4 of the drawings illustrates a suitable electric circuit arrangement utilizing well known forms of light-responsive devices and gate components. Thus, each of the light-responsive devices 20 comprises a photo transistor 90, the emitter of which is connected through conductor 56 to the anode of the diode 92 forming a part of conventional "and" gate component 52. This component includes the additional diodes 94 and 96, the anodes of which are connected to receive the output signals of the associated X decoder 36 and Y decoder 46, respectively. The cathodes of the diodes are connected through the "and" component 58 to the input of the "hit" indicator 60. Thus, if the electric signal to any one of the diodes is false, the diode 92 will be back biased and the "hit" indicator will not activated.

The emitter of each photo transistor 90 also is connected to the cathode of a diode 98 forming a part of the "or" gate component 84. This component includes sufficient diodes to accommodate all of the plurality of photo transistors. The anodes of the diodes 98 are connected to the anode of a diode 100 in he "and" gate component 82. A second diode 102 in the component 82 has its anode operatively connected through conductor 80 to the output of the readout head 76 associated with the magnetic penalty track 74. The anode of a third diode 104 is connected to the output of the matching signal generator 88. The cathodes of these diodes are connected to the input of the "penalty" indicator 86. Only one of the diodes will be forward biased at any one time, and if the penalty track provides a signal through the diode 102 at that time, the "penalty" indicator will be activated.

Let it be assumed, for example, that the trainee fires the strobe light gun 18 to activate the light-responsive device 20' located behind the screen 14 at the 5, 7 coordinate position illustrated in FIG. 2 at the time the target pheasant 16 is projected onto the screen from the picture frame illustrated in FIG. 3. Accordingly, the proper electric signals will be "anded" together at the "and" gate component 52 and the "hit" indicator 60 will be activated to evidence a successful hit.

On the other hand, if the trainee fires the strobe light gun to activate any light-responsive device when the coding on the penalty track 74 indicates the target to be out of range, or the time for firing at the target has expired, the "anded" signals at the "and" gate component 82 will function to activate the "penalty" indicator 86.

If desired, the infrared strobe light gun 18 may be provided with a second light providing a small high intensity spot on the screen to give visible evidence to the trainee that he has scored a hit. In FIG. 1 the gun 18 is provided with such a second light 106. The light is connected electrically to the hit indicator 60 which, when activated, provides a momentary source of electric potential for the light.

The circuit diagram shown in FIG. 5 illustrates the manner in which the apparatus of FIG. 1 may be modified to accommodate the simultaneous use of a plurality of strobe light guns, each having its own penalty indicator and hit indicator. Thus, the second gun 18' is connected through its associated pulse generator 88' to an input of its associated "and" gates 58' and 82', the outputs of which are connected to the hit indicator 60' and penalty indicator 86', respectively. The "and" gate 58' also has an input connected to the output of the same "and" gate 52 that is connected to the "and" gate 58 associated with the previously described first gun 18. Similarly, the "and" gate 82' has one input connected to the output of the "or" gate 84, and another input connected to the conductor 80 associated with the penalty track 74. Any number of additional strobe light guns and associated indicators may be provided, as desired.

It is to be noted that since activation of each gun 18 or 18' provides a matching signal only to its associated "and" component 58 or 58', the associated penalty or hit indicator cannot be activated by the unassociated gun, unless it is activated at precisely the same time as the associated gun. The probability of such precise timing, within a few microseconds of each other, is quite remote.

It also may be desirable to provide means for indicating a "cripple" in the training of shot gun shooting of birds on the wing. This may be accommodated in the present invention by the provision of additional magnetic coded tracks and associated circuitry for activating a "cripple" indicator when any of the photo transistors immediately adjacent a target hit photo transistor, are activated.

Although the magnetic tracks are shown in FIG. 3 as being located immediately adjacent the sides of the corresponding picture frame 12', they may be located in the space between picture frames. Further, the coded information on the tracks may be displaced several frames away from the frame with which it is associated.

It will be apparent to those skilled in the art that the foregoing and various other changes in the size, number, type and arrangement of parts described hereinbefore may be made without departing from the spirit of this invention and the scope of the appended claims.

We claim:
1. Gunnery training apparatus comprising:
a. a motion picture screen of material which permits a beam of light rays of a predetermined characteristic to pass therethrough for activating a light-responsive electric signal producing means;
b. a plurality of light-responsive electric signal producing means arranged behind the screen each at a different coordinate position;
c. a motion picture projector and film including means adapted to project onto the screen a target image lacking said predetermined characteristic necessary to activate said light-responsive electric signal producing means;

d. a light-emitting gun including means providing a beam of light rays having said characteristic to be directed through the screen to the light-responsive means for activating said means;

e. electric coordinate signal producing means coded to provide electric signals representing the coordinate position of a target on each frame of motion picture film projected on the screen by the projector;

f. electric coordinate signal comparing means;

g. means connecting the light-responsive electric signal producing means and the electric coordinate signal producing means to the electric coordinate signal comparing means; and h. electric "hit" indicator means connected to the electric coordinate signal comparing means and operable upon comparison of electric signals at said comparing means to indicate a target hit.

2. The apparatus of claim 1 including:

a. a visible light-emitting lamp on the gun having an electric circuit; and b. means associated with the "hit" indicator means operable upon activation of the latter to complete the electric circuit of the visible lamp to illuminate the target area on the screen.

3. The apparatus of claim 1 including:

a. electric signal compare means interconnecting the electric coordinate signal comparing means and the "hit" indicator means;

b. electric matching signal producing means connected to the gun for activation by the latter; and c. means connecting the output of the matching signal producing means to the compare means.

4. The apparatus of claim 1 including:

a. a plurality of light-emitting guns;

b. a plurality of "hit" indicator means one associated with each gun;

c. a plurality of electric matching signal producing means one connected to each gun for activation by the latter;

d. a plurality of electric signal compare means one associated with each gun;

e. means connecting the output of the electric signal coordinate comparing means to the input of each electric signal compare means;

f. means connecting the output of each matching signal producing means to the input of the compare means associated with the same gun; and g. means connecting the output of each compare means to the associated "hit" indicator means.

5. The apparatus of claim 1 wherein the coordinate signal producing means comprises a pair of magnetic tracks coded in binary digits synchronized with each frame of motion picture film, and electric signal-producing magnetic read out means is associated with each magnetic track.

6. The apparatus of claim 5 wherein the electric coordinate signal comparing means comprises:

a. a pair of electrical binary digit coordinate counters connected one to each read out means;

b. electric decoder means arranged in pairs connected to each counter for producing an electric signal representing the base ten number corresponding to the binary digit count of the associated counter;

c. an electrical "and" gate component having a plurality of inputs one connected to each decoder and another connected to the associated light-responsive electric signal producing means; and d. the output of the gate component being connected to the "hit" indicator means.

7. The apparatus of claim 6 including:

a. electrical timing signal producing means comprising a magnetic timing track coded in binary digits synchronized with each frame of motion picture film;

b. electric signal producing magnetic read out means associated with the timing track;

c. an electrical binary digit timing counter having an input connected to the timing track read out means;

d. the timing counter having one output connected to the pair of coordinate counters for stepping the latter through each count; and e. the timing counter having a second output connected to the coordinate counters and timing counter for resetting said counters after each frame count.

8. The apparatus of claim 1 including:

a. electric penalty signal producing means coded to provide an electric signal representing a time condition during which firing the gun at the screen imposes a penalty;

b. electric penalty signal comparing means;

c. means connecting the light-responsive electric signal producing means and the electric penalty signal producing means to the electric penalty signal comparing means; and d. electric penalty indicator means connected to the electric penalty signal comparing means and operable upon comparison of electric signals at the penalty signal comparing means to indicate a penalty.

9. The apparatus of claim 8 wherein:

a. the penalty signal producing means comprises a magnetic penalty track coded in binary digits synchronized with each frame of motion picture film;

b. electric signal producing magnetic read out means is associated with the penalty track;

c. the electric penalty signal comparing means comprises:
 1. an electrical "or" gate component having a plurality of inputs one connected to each light-responsive electric signal producing means, and
 2. an electrical "and" gate component having a plurality of inputs one connected to the output of the "or" gate component and another connected to the output of the penalty read out means;

d. the output of the "and" gate component being connected to the penalty indicator means.

10. The apparatus of claim 8 including:

a. electric matching signal producing means connected to the gun for activation by the latter; and b. means connecting the output of the matching signal producing means to the penalty signal comparing means.

11. The apparatus of claim 8 including:

a. a plurality of light-emitting guns;

b. a plurality of penalty indicator means one associated with each gun;

c. a plurality of electric penalty signal comparing means one associated with each gun;

d. a plurality of electric matching signal producing means one connected to each gun for activation by the latter;

e. means connecting the light-responsive electric signal producing means and the electric penalty signal producing means to each penalty signal comparing means;

f. means connecting each matching signal producing means to the comparing means associated with the same gun; and g. means connecting the output of each comparing means to the associated penalty indicator means.